United States Patent [19]

O'Briem et al.

[11] Patent Number: 5,534,614

[45] Date of Patent: Jul. 9, 1996

[54] METHOD FOR THE PREPARATION OF AMIDE OLIGOMERS AND POLYBENZAZOLE POLYMERS THEREFROM

[75] Inventors: James J. O'Briem; Edmund P. Woo, both of Midland, Mich.

[73] Assignee: The Dow Chemical Company, Midland, Mich.

[21] Appl. No.: 218,475

[22] Filed: Mar. 28, 1994

Related U.S. Application Data

[62] Division of Ser. No. 33,680, Mar. 16, 1993, Pat. No. 5,322,916.

[51] Int. Cl.$^6$ ............................ C08G 69/00; C08G 69/44
[52] U.S. Cl. ........................ 528/183; 528/185; 528/332; 528/335; 528/336; 528/348
[58] Field of Search ..................................... 528/170, 171, 528/172, 173, 183, 185, 335, 336, 337, 345, 372, 327, 332, 348

[56] References Cited

U.S. PATENT DOCUMENTS

| | | |
|---|---|---|
| 3,316,213 | 4/1967 | Berr . |
| 3,376,257 | 4/1968 | Nakanishi et al. . |
| 3,408,336 | 10/1968 | Benson . |
| 3,449,296 | 6/1969 | Angelo et al. . |
| 3,509,108 | 4/1970 | Prince . |
| 3,551,389 | 12/1970 | Prince, Jr. . |
| 3,560,438 | 2/1971 | Burton et al. . |
| 3,644,288 | 2/1972 | Odier et al. . |
| 3,852,239 | 12/1974 | Bellmann et al. . |
| 4,332,883 | 6/1982 | Ahne et al. . |
| 4,398,009 | 8/1983 | Ahne et al. . |
| 4,452,972 | 6/1984 | Choe et al. . |
| 4,533,693 | 8/1985 | Wolfe et al. . |
| 4,608,427 | 8/1986 | Sweeny et al. ................ 528/179 |
| 4,772,678 | 9/1988 | Sybert et al. . |
| 4,845,183 | 7/1989 | Mueller et al. . |
| 4,847,530 | 7/1989 | English et al. . |
| 4,939,215 | 7/1990 | Mueller et al. . |
| 4,945,153 | 7/1990 | Nishino et al. . |

FOREIGN PATENT DOCUMENTS

| | | |
|---|---|---|
| 317942 | 5/1989 | European Pat. Off. . |
| 2188936 | 10/1987 | United Kingdom . |

OTHER PUBLICATIONS

*Polymer Processing Technologies,* edited by Fred W. Billmeyer, "Textbook of Polymer Science," Part 6, 3rd ed., pp. 455–521, (Jun. 1984), John Wiley.

*Primary Examiner*—Jeffrey Mullis

[57] ABSTRACT

A polyamide precursor of a polybenzazole polymer is prepared by reacting an aromatic bis(alkenyl)ester with a ring forming, aromatic diamine. The precursor can be prepared in an organic solvent for the monomers to form a soluble polyamide precursor which can be subsequently cyclocondensed to form a PBX polymer. A polybenzoxazole precursor is prepared by the reaction of a bis(alkenyl)ester and a bis(ortho-hydroxyamine). A polybenzazole polymer is easily prepared by heating the polyamide, PBX precursor.

9 Claims, No Drawings

METHOD FOR THE PREPARATION OF AMIDE OLIGOMERS AND POLYBENZAZOLE POLYMERS THEREFROM

This is a divisional of application Ser. No. 08/033,680, filed Mar. 16, 1993, now U.S. Pat. No. 5,322,916.

BACKGROUND OF THE INVENTION

This invention relates to a method for preparing polyamide precursors and poly(amide/benzazole) intermediates for benzazole polymers, to a method for preparing polybenzazole polymers; and to the polybenzazole polymer precursors, poly(amide/benzazole) intermediates and the resulting polybenzazole polymers.

Polymeric materials which are relatively easy to process and useful in ultra high temperature applications such as 300° C. to 400° C. are of interest for preparing films, coatings, fibers, electronic components and composites. Depending on the specific end-use application, the polymers should exhibit one or more of the following properties: mechanical integrity, low moisture absorption, thermo-oxidative stability, thermal stability, solvent resistance, hydrolytic stability, resistance to highly acidic or basic solutions, a low coefficient of thermal expansion and a low dielectric constant. For example, in the electronics industry, it is generally desirable for the material to exhibit a relatively low dielectric constant, high thermo-oxidative stability, good solvent resistance, low moisture uptake and a low coefficient of thermal expansion.

In addition to the mentioned physical properties, the processability of the materials is an important property. For example, in the preparation of electronic components such as wafers and flexible circuit boards, the electronic component is often coated with an insulative or protective coating. To effectively coat the component, the electrically insulative or protective coating is commonly applied from solution and the solvent evaporated.

Currently, polyimide resins are one class of materials which are commonly employed for preparing high strength films, fibers, composites, and coatings, including insulative or protective coatings in the electronics industry. However, polyimide resins suffer from water absorption and hydrolysis which can lead to circuit corrosion and migration of metal ions into the dielectric polyimide layer.

Polybenzazoles (PBX) resins such as polybenzoxazole (PBO), polybenzothiazole (PBT) and polybenzimidazole (PBI) resins exhibit relatively better thermo-oxidative stabilities than polyimides and have improved resistance to water absorption and hydrolysis.

A common method for preparing PBX polymers comprises polymerizing the monomers, commonly an ortho substituted diamine such as bis(ortho-hydroxyamine), bis(ortho-thioloamine) or a tetraamine with an aromatic diacid chloride, dicarboxylic acid or alkyl or aryl diester in a non-oxidizing acid liquid reaction medium, preferably polyphosphoric acid or methanesulfonic acid. The monomers are completely reacted and directly converted to the final PBX polymer under a non-oxidizing atmosphere with vigorous mixing and high shear. The water formed during the reaction, which stops or impedes the polymerization reaction, is compensated by the dehydrating nature of the acid. While the polymer forms a solution in the acid (commonly called a "dope"); it is typically extremely viscous and flows only at elevated temperatures.

The PBX materials can be spun into fibers or extruded into films from their acidic solutions. For example, fibers and films can be directly formed from the polymerization solution ("dope") by extruding or spinning with subsequent removal of the acid solvent. However, the corrosive nature of the acid solvent renders the PBX polymers unsuitable for certain end use applications such as the preparation of electronic components. The polymer can be isolated by evaporation of the solvent or polymer precipitation from the dope and the polymer redissolved in another solvent. While some PBX polymers are soluble in cresol, the preferred solvents are again non-oxidizing acids, including polyphosphoric acid, methanesulfonic acid or sulfuric acid. Therefore, the problems associated with the corrosive nature of the acid solvent are not alleviated. See, for example, U.S. Pat. Nos. 4,533,693; 4,608,427; 4,772,678; and 4,847,530.

There are a number of other methods for preparing PBO polymers. For example, U.S. Pat. No. 3,316,213 teaches preparing aromatic polyamides and aromatic polyoxazoles including PBO polymers by the reaction of a diamine having a structural formula:

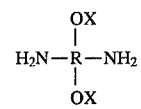

wherein X is for example hydrogen or alkyl and R is an aromatic tetravalent radical with a diphenyl ester of a dicarboxylic acid having the formula:

wherein $R^1$ is arylene and Y is aryloxy, preferably phenoxy to form a prepolymer such as represented by the formula:

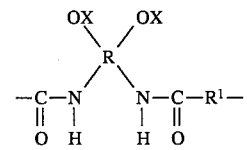

Unfortunately, the prepared prepolymer precipitates from solution at relatively low inherent viscosities or degrees of polymerization (i.e., relatively low molecular weights). To process the prepolymer it is melted into desired shape and then converted to the desired PBO polymer. U.S. Pat. No. 3,449,296 teaches the reaction of the same diamine compounds with a diacid halide.

Other techniques for preparing PBO materials from a diamine and a dicarboxylic acid or an acid halide or ester thereof are also described in U.S. Pat. Nos. 4,939,215; 3,408,336; and 4,452,972.

U.S. Pat. No. 3,551,389 teaches a method for preparing aromatic polybenzimidazoles (PBI) by the reaction of an aromatic tetraamine with a diphenyl ester of an aromatic dicarboxylic acid, a diphenyl ester of a heterocyclic dicarboxylic acid or an anhydride of an aromatic dicarboxylic acid. See also U.S. Pat. No. 3,509,108. Again, the described method makes PBI materials which are solid and insoluble in most common organic solvents.

U.S. Pat. No. 4,332,883 teaches preparing a polyoxazole precursor of an olefinic unsaturated monoepoxide on a hydroxy group containing the polycondensation product of an aromatic and/or heterocyclic dihydroxy diamino compound in a dicarboxylic acid chloride or ester. The product is a photosensitive PBO precursor. The prepolymers are prepared by reacting the diamine with an ester or chloride of a dicarboxylic acid at lower than ambient temperatures, e.g., −5° C. to −20° C. in an organic solvent. The resulting prepolymer is soluble in the solvent as a viscous solution, and is precipitated from solution and then reacted with an epoxy such as a glycidylmethacrylate.

U.S. Pat. No. 4,945,153 discloses a method for producing a prepolymer of an aromatic polybenzothiazole (PBT) or polythiazole from an aromatic diaminodithio compound salt in a dicarboxylic acid derivative in the presence of a phosphoric acid compound. The dicarboxylic acid derivatives include those having carboxylic acid groups substituted as follows:

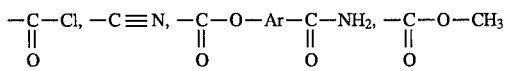

wherein Ar is an aromatic ring. The reaction is conducted in the presence of a polyphosphoric acid compound at a controlled temperature such that a prepolymer having a large polymerization degree can be obtained without ring closure. Unfortunately, polyphosphoric acid and its attendant disadvantages are not eliminated in the described method.

In view of the stated deficiencies of the prior art, it remains desirable to provide a method to prepare PBX polymers and oligomers or precursors thereof which are more easily processed as a non-corrosive solution while retaining the excellent physical and chemical properties of the resulting polymer.

SUMMARY OF INVENTION

Accordingly, in one aspect, the present invention is a method for preparing a polyamide precursor to a PBX polymer, said method comprising reacting an aromatic bis(alkenyl)ester with an aromatic diamine having ring closing functional groups ortho to each amine group. In a preferred embodiment, the bis(alkenyl)ester and ring forming, aromatic diamine are reacted in an organic solvent for the monomers at conditions sufficient to form a soluble polyamide precursor which can be subsequently cyclocondensed to form a PBX polymer. In a particularly preferred embodiment, a PBO precursor is prepared by the reaction of a bis(alkenyl)ester and a bis(ortho-hydroxyamine), preferably in an organic solvent for the monomers at conditions sufficient to form a soluble poly(orthohydroxyamide).

In another aspect, the present invention is a method for the preparation of PBX polymers by the reaction and cyclocondensation of an aromatic bis(alkenyl)ester with an aromatic diamine having ring closing functional groups ortho to each amine group. For example, a PBO polymer is prepared by the reaction of an aromatic bis(alkenyl)ester with a bis(ortho-hydroxyamine) to form a poly(ortho-hydroxyamide) and cyclo-dehydration of the poly(ortho-hydroxyamide).

In yet another aspect, the present invention is the poly(amide/benzazole) intermediate to a PBX polymer. In still yet another embodiment, the present invention is a PBX polymer having at least one alkenyl ester end group.

The polyamide, PBX precursor can be prepared in a controlled manner by the reaction of a bis(alkenyl)ester such as diisopropenyl isophthalate with a bis(ortho-functional amine) such as 3,3'-dihydroxybenzidine. The molecular weight of the reaction product can be controlled by the time and temperature of the reaction as well as the stoichiometry of the reactants. The resulting precursor product is soluble in many common organic solvents such as N-methylpyrrolidinone.

A PBX resin is easily prepared by heating the polyamide, PBX precursor. As such, the polyamide, PBX precursor can be directly converted from a soluble, processable material to the finished, insoluble polymer. Hence, the method of the present invention facilitates the preparation of finished PBX polymer articles. For example, in the preparation of coatings, the soluble PBX precursor can be applied to a substrate or article being coated; then the solvent evaporated. To prepare the final PBX coating, the article is then heated. This ease in processing facilitates the manufacture of electronic and structural articles, including films, coated microcircuits, composites, adhesively bonded articles and devices, fibers, disks and the like. In addition, since the solvents can be common volatile organic liquids, the problems associated with the use of the more corrosive acids such as polyphosphoric acid is eliminated. In addition, ionic impurities are not generated during reaction or added to enhance solubility.

The polymeric materials prepared by the method of the present invention are useful in a large variety of industrial applications including electronic insulated coatings, electrical insulation, wire coating, protective and release coatings, gas separation membranes, fibers, structural composites, adhesives, and wrapping and packaging films.

DETAILED DESCRIPTION OF THE INVENTION

As used herein, the term PBX means any polybenzazole polymer including polybenzoxazole (PBO), polybenzothiazole (PBT) and polybenzimidazoles (PBI). Preferably, the PBX is polybenzoxazole.

In the method of the present invention, the polyamide, PBX precursor is prepared by the reaction of a bis(alkenyl)ester and a ring forming, aromatic diamine. By the term "ring forming aromatic diamine" is meant an aromatic diamine having reactive moieties ortho to each amine group which are capable of reacting with the amide carbonyl moiety of the polyamide, PBX precursor to form a ring structure. Representative of such groups are —OH, —OR", —SH, —SR", —NH$_2$, —NHR', —NR$_2$", and halo wherein R" is as hereinafter defined.

Aromatic bis(alkenyl)esters and ring forming, aromatic diamines suitably employed in the practice of the present invention are those esters and diamines which are capable of reacting to form an amide. In general, the reaction is a polycondensation reaction liberating a ketone or aldehyde, which is commonly gaseous at the reaction temperature, upon the reaction of the bis(alkenyl)ester and diamine.

Representative of the aromatic bis(alkenyl)esters include compounds of the following structural formula:

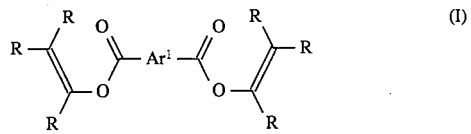
(I)

in which Ar$^1$ can be an aromatic, including polyaromatic and fused aromatic, or inertly substituted aromatic, wherein "inertly substituted aromatic" means an aromatic having one or more substituent group such as a halogen which is essentially inert, preferably inert, to reaction with the aromatic bis(alkenyl)ester. For example, Ar$^1$ can be:

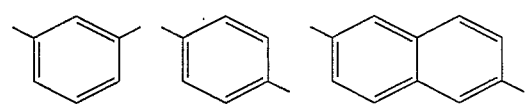
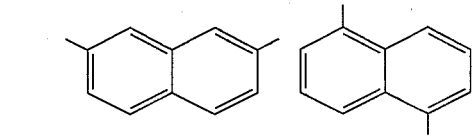
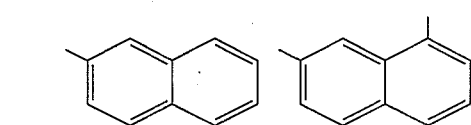
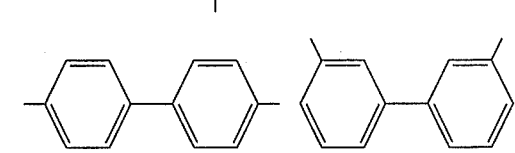
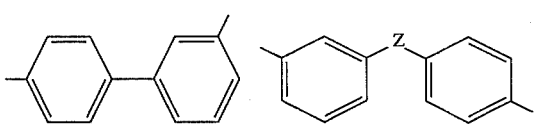
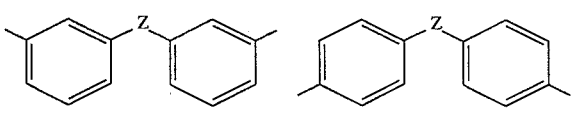
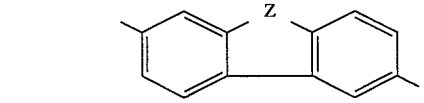
or their halogenated derivatives, wherein Z can be:
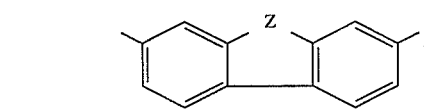
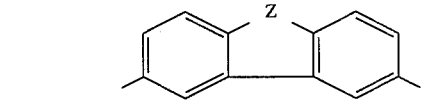
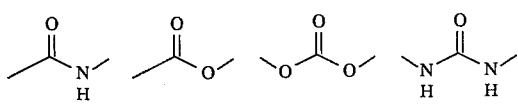
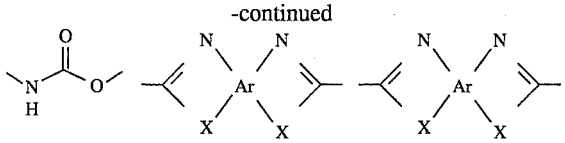
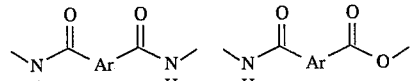
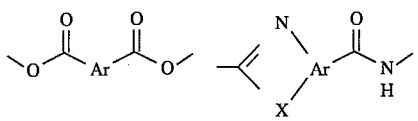
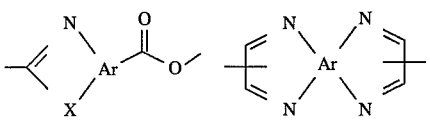
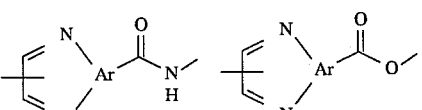
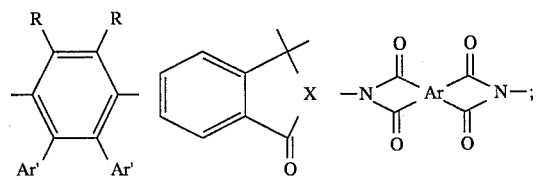
wherein Ar and Ar' can each independently can be an aromatic hydrocarbon or halogenated derivative thereof; Ar' can be:
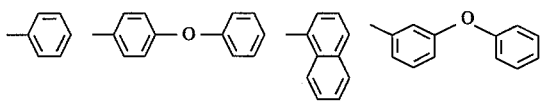
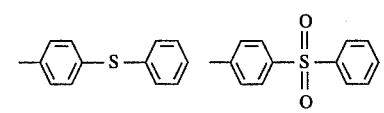
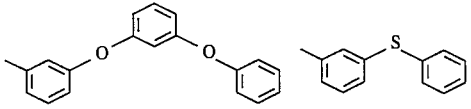
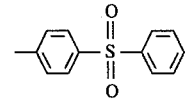
and each R' can independently be —H, —CH$_3$, —CH$_2$CH$_3$, —(CH$_2$)$_2$CH$_3$, —(CH$_2$)$_3$CH$_3$;
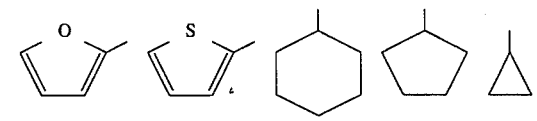

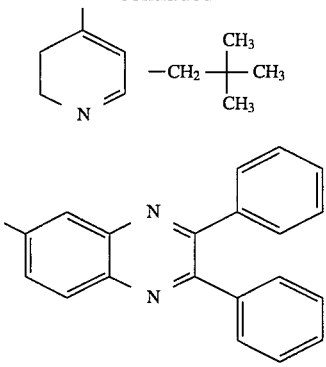

and X can be oxygen, sulfur, NH, N-alkyl or N-aryl. In structural Formula (I), $Ar^1$ is preferably:

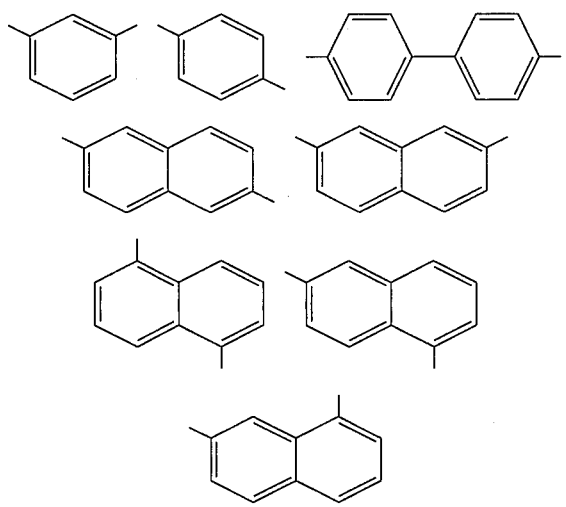

and each R is advantageously —H, —$CH_3$, —$CH_2CH_3$ or Ar, preferably —H or —$CH_3$, most preferably —H.

For example, the aromatic bis(alkenyl)ester can be a derivative of one or more of the following aromatic dicarboxylic acids: isophthalic acid; terephthalic acid; biphenyl-3,3'-dicarboxylic acid; biphenyl-4,4'-dicarboxylic acid; biphenyl-3,4'-dicarboxylic acid; diphenylmethane-3,3'-dicarboxylic acid; diphenylmethane- 4,4'-dicarboxylic acid; diphenylmethane-3,4'-dicarboxylic acid; difluorodiphenylmethane-3,3'-dicarboxylic acid; difluorodiphenylmethane-4,4'-dicarboxylic acid; difluorodiphenylmethane-3,4'-dicarboxylic acid; 2,2-diphenylpropane- 3,3'-dicarboxylic acid; 2,2-diphenylpropane- 4,4'-dicarboxylic acid; 2,2-diphenylpropane- 3,4'-dicarboxylic acid; 2,2-diphenylpropane-3,4'-dicarboxylic acid; 2,2-diphenylhexafluoropropane-3,3'-dicarboxylic acid; 2,2-diphenylhexafluoropropane-4,4'-dicarboxylic acid; 2,2-diphenylhexafluoropropane-3,4'-dicarboxylic acid; 1,1-bis(4-carboxyphenyl)-2,2,2-trifluoroethane; 1,1-bis(4-carboxyphenyl)-1-phenyl- 2,2,2-trifluoroethane; 1,1-bis(3-carboxyphenyl)-2,2,2-trifluoroethane; 1,1-bis(3-carboxyphenyl)-1-phenyl- 2,2,2-trifluoroethane; 1-(3-carboxyphenyl)-1-(4-carboxyphenyl)-2,2,2-trifluoroethane; 1-(3-carboxyphenyl)-1-(4-carboxyphenyl)- 1-phenyl-2,2,2-trifluoroethane; naphthalene-2,6-dicarboxylic acid; diphenylether-3,3'-dicarboxylic acid; diphenylether-4,4'-dicarboxylic acid; diphenylether-3,4'-dicarboxylic acid; diphenylsulfide- 3,3'-dicarboxylic acid; diphenylsulfide-4,4'-dicarboxylic acid; diphenylsulfide-3,4'-dicarboxylic acid; diphenylsulfone-3,3'-dicarboxylic acid; diphenylsulfone- 4,4'-dicarboxylic acid; diphenylsulfone-3, 4'-dicarboxylic acid; diphenylsulfone-3,4'-dicarboxylic acid; diphenylsulfoxide-3,3'-dicarboxylic acid; diphenylsulfoxide- 4,4'-dicarboxylic acid; diphenylsulfoxide-3,4'-dicarboxylic acid; benzophenone-3,3'-dicarboxylic acid; benzophenone-4,4'-dicarboxylic acid; benzophenone-3,4'-dicarboxylic acid; bis(4-carboxyphenyl)-methyl phosphine oxide; bis(4-carboxyphenyl) diphenylsilane.

The bis(alkenyl)ester is preferably a derivative of isophthalic acid, terephthalic acid, 4,4'-diphenyloxide, dicarboxylic acid, biphenyl-3,3'-dicarboxylic acid, biphenyl-4,4'-dicarboxylic acid or biphenyl-3,4'-dicarboxylic acid. The most preferred bis(alkenyl)ester is the diisopropenyl isophthalate or diisopropenyl terephthalate.

In addition, mixtures of two or more aromatic bis(alkenyl)esters can be employed and such mixtures are often employed to improve the solubility of the polyamide, precursor to the PBX polymer. For example, using 1,3-diamino-4,6-dihydroxybenzene as the ring forming, aromatic diamine; the bis(alkenyl)ester is preferably a mixture of terephthalate and isophthalate.

Representative ring forming, aromatic diamines useful in the practice of the present invention include compounds of the following structural formula:

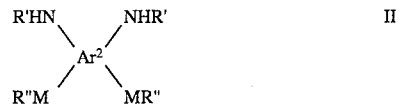

wherein MR" can be halogen, preferably chlorine; or M is O (oxygen), S (sulfur), NH, or NR", preferably O, NH or S and most preferably O, and each R' and R" are independently hydrogen, alkyl or inertly substituted alkyl, aryl or inertly substituted aryl, acyl

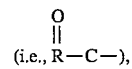

or aroyl

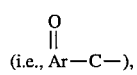

alkoxycarbonyl, aryloxycarbonyl, or trialkylsilyl with the proviso that R' is not alkyl or aryl if bound to the amine nitrogen. Most preferably, R' is hydrogen. Advantageously, each R" is independently hydrogen, an alkyl having from 1 to 4 carbon atoms or a trialkylsilyl. Preferably, each R" is individually hydrogen or a trialkylsilyl group, with each R" most preferably being hydrogen. $Ar^2$ is a tetravalent aromatic or inertly substituted aromatic. Representative examples of $Ar^2$ include:

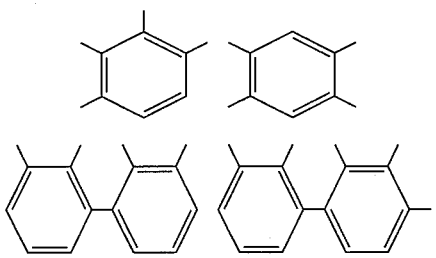

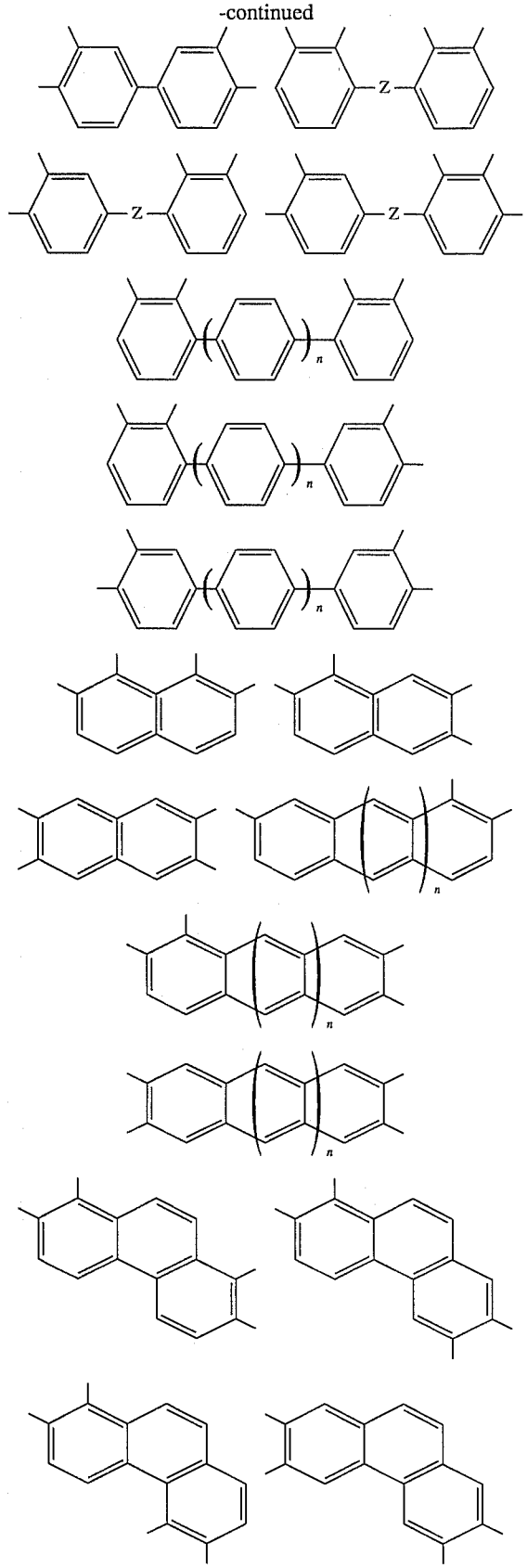
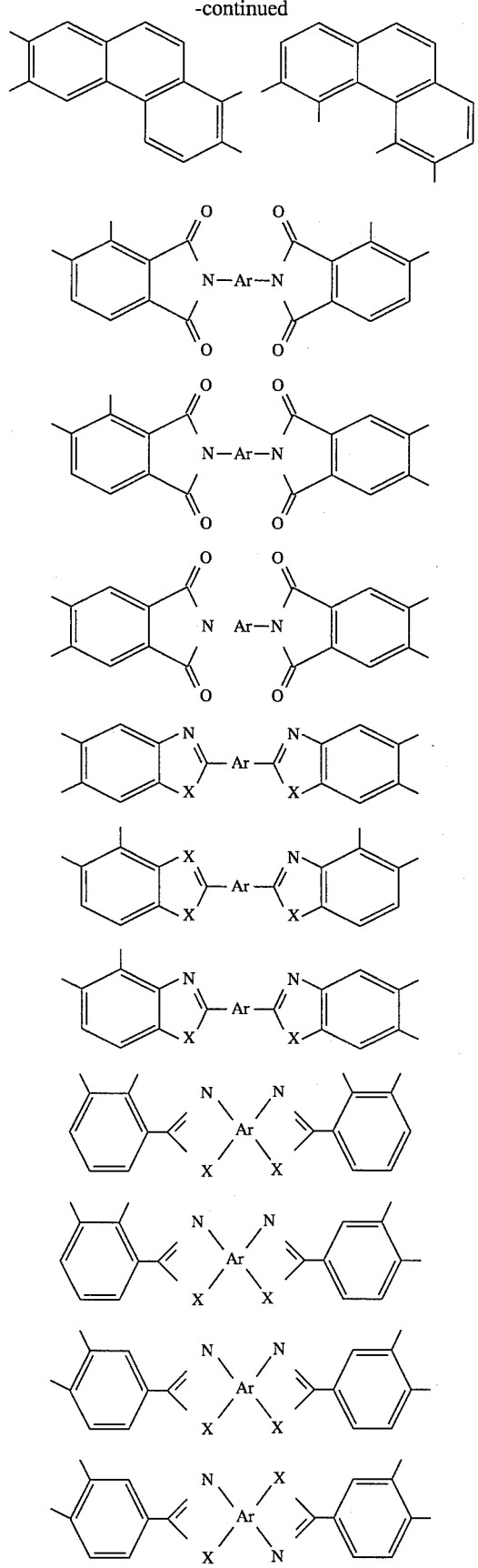

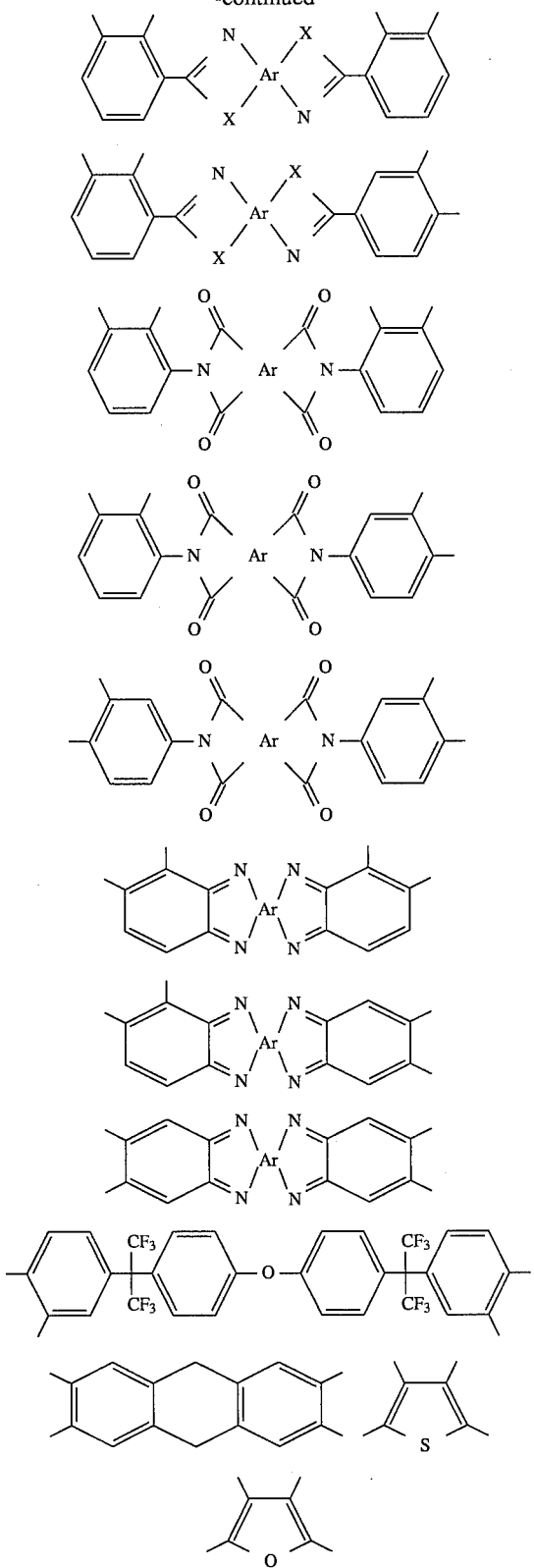

wherein X, Z and Ar are as hereinbefore defined. In structural Formula II, Ar² is preferably:

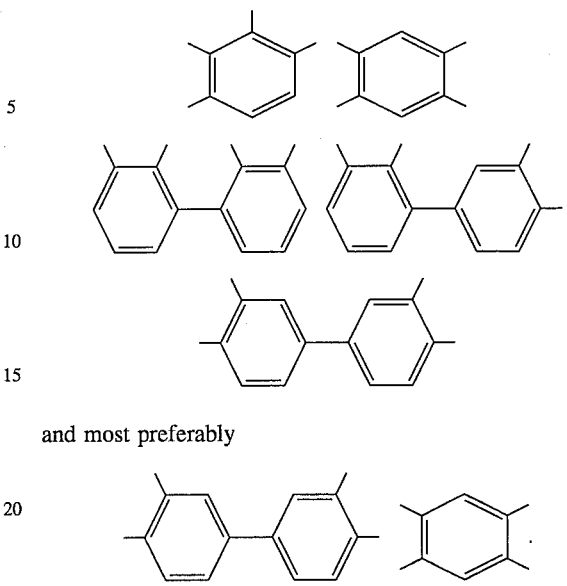

and most preferably

For example, the bis(ortho-hydroxyamine) can be 1,3-diamino-4,6-dihydroxybenzene; 1,4-diamino-2,5-dihydroxybenzene; bis(4-amino-3-hydroxy)biphenyl; bis(4-amino- 3-hydroxyphenyl)ether; bis(4-amino-3-hydroxyphenyl) sulfide; bis(4-amino-3-hydroxyphenyl)-sulfone; bis(4-amino-3-hydroxyphenyl)-ketone; bis(4-amino-3-hydroxyphenyl)methane; 1,2-bis(4-amino-3-hydroxyphenyl)ethane; 2,2-bis(4-amino-3-hydroxyphenyl)-propane; bis(4-amino-3-hydroxyphenyl)bis-(trifluoromethyl)methane; N-(4-amino-3-hydroxyphenyl)3-hydroxy-4-aminobenzamide; (4-amino-3-hydroxyphenyl)3-hydroxy-4-aminobenzoate; (4-amino-3-hydroxyphenyl)4-amino-3-hydroxyphenyl carbamate; N,N'-bis(4-amino-3-hydroxyphenyl)urea; bis(3-amino-4-hydroxyphenyl)ether; bis(3-amino- 4-hydroxyphenyl) sulfide; bis(3-amino-4-hydroxyphenyl)-sulfone; bis(3-amino-4-hydroxyphenyl)-ketone; bis(3-amino-4-hydroxyphenyl) methane; 1,2-bis(3-amino-4-hydroxyphenyl)ethane; 2,2-bis(3-amino-4-hydroxyphenyl)propane; bis(3-amino-4-hydroxyphenyl)dimethyl silane; bis(3-amino-4-hydroxyphenyl)dibutyl silane; bis(3-amino-4-hydroxyphenyl) methyl phosphine; bis(3-amino-4-hydroxyphenyl)butyl phosphine; 1,5-diamino- 2,6-dihydroxynaphthalene; 1,6-diamino-2,5-dihydrosynaphthalene; 2,5-diamino-1,6-dihydroxynaphthalene; 2,6-diamino-1,5-dihydroxynaphthalene; 1,5-diamino-2,6-dihydroxy-naphthalene; 1,6-diamino-2,7-dihydroxynaphthalene; 2,5-diamino-1,7-dihydroxynaphthalene; 1,7-diamino-2,6-dihydroxynaphthalene; 2,7-diamino-1,6-dihydroxynaphthalene; 2,7-diamino-3,6-dihydroxynaphthalene; 3,7-diamino-2,6-dihydroxynaphthalene; 1,5-diamino-4,8-dihydroxynaphthalene; 1,8-diamino-2,7-dihydroxyphenanthrene. Mixtures of two or more ring forming, aromatic dimanes can be employed. Preferably, the (ortho-hydroxyamines) are 1,3-diamino- 4,6-dihydroxybenzene; 1,4-diamino-2,5-dihydroxybenzene; bis(4-amino-3-hydroxyphenyl)ether; 1,2-bis(4-amino-3-hydroxyphenyl)ethane and 1,5-diamino-2,6-dihydroxynaphthalene.

The polyamide, PBX precursor product will vary depending on the amount of each of the bis(alkenyl)ester and ring forming, aromatic diamine employed. In general, the bis(alkenyl)ester and ring forming, aromatic diamine are advantageously employed in amounts from about 0.75 to about 1.25, preferably from about 0.8 to about 1.2, more preferably from about 0.9 to about 1.1, equivalents of the bis(alkenyl)ester per equivalent of the ring forming, aromatic diamine. Most preferably, equivalent or stoichiometric amounts of the aromatic ester and aromatic diamine are employed.

The reaction of the aromatic bis(alkenyl)ester and ring forming, aromatic diamine is conducted at temperatures and conditions such that the ester and amine react to form a polyamide precursor of a PBX polymer.

Although the reaction can be conducted neat (i.e., in the absence of an organic liquid or other reaction diluent) and the resulting solid product either dissolved in an organic liquid (if the reaction is controlled to prepare a soluble polyamide, PBX precursor) or further processed directly from solid form, the reaction is generally advantageously conducted in an organic liquid which is a solvent for both the bis(alkenyl)ester and ring forming, aromatic diamine reactants as well as the linear polyamide precursor. The specific organic liquid solvent most advantageously employed will be dependent on a variety of factors including the specific monomers employed and the desired polyamide, PBX precursor, including its molecular weight. In general, the organic liquid solvent will be a polar aprotic solvent such as N-methylpyrrolidinone; N-cyclohexylpyrrolidone; N,N-dimethyl acetamide; N,N-dimethyl formamide; N,N,N',N'-tetramethylurea, butyrolactone, diglyme and the like. In general, the preferred organic liquid solvents are N,N-dimethyl acetamide; N-methylpyrrolidinone and dimethylformamide, with N-methylpyrrolidone being most preferred.

The concentrations at which the monomers are most advantageously employed in the organic liquid reaction medium are dependent on a variety of factors including the specific monomers and organic liquid employed and the polymer being prepared. In general, the monomers are employed in an amount from about 1 to about 99 percent based on the total weight of the monomers and the organic reaction liquid. In general, the monomers are preferably employed in an amount from about 5 to about 70, more preferably in an amount from about 10 to about 40 weight percent based on the total weight of the monomers and organic reaction liquid employed.

The polyamide, PBX, precursor is prepared by reacting the bis(alkenyl)ester and the aromatic diamine at conditions to form a soluble poly(ortho-hydroxy (thio)amide) solution. The specific conditions employed may vary depending on the monomers employed, the organic liquid reaction medium and the desired polymer. The time and temperature are selected in order to achieve a soluble precursor of the desired molecular weight. In general, the reaction mixture is heated to a temperature from about 50° C. to about 300° C., preferably from about 100° C. to about 200° C., and more preferably from about 150° C. to about 190° C. for a time which will generally vary from about 15 minutes to about 200 hours. The reaction time will preferably range from about 30 minutes to about 50 hours, more preferably from about 1 to about 10 hours.

While not being bound by theory, the preparation of the PBO precursor can be represented as:

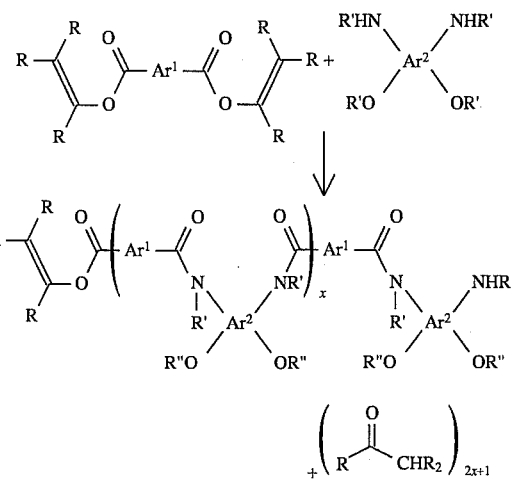

wherein $Ar^1$, $Ar^2$, R' and R" are as hereinbefore defined and x can be any number from 1 to essentially infinity provided the precursor remains soluble in the organic liquid. In general, x will not exceed 100,000, more commonly x will not exceed 10,000 and most commonly x will not exceed 1,000.

While the precursor shown in the reaction scheme is illustrated with one terminal amine and one terminal alkenyl ester group, the precursor may have two amine end groups, two alkenyl ester end groups or any mixture of amine and alkenyl ester end groups. In general, the end groups will depend on the relative concentration of the bis(alkenyl)ester and the aromatic diamine employed in the reaction; with a stoichiometric excess of aromatic bis(alkenyl)ester giving more alkenyl ester end groups and alternatively, a stoichiometric excess of diamine giving a greater proportion of amine end groups. The polyamide, PBX, precursor can be represented by the following chemical formula:

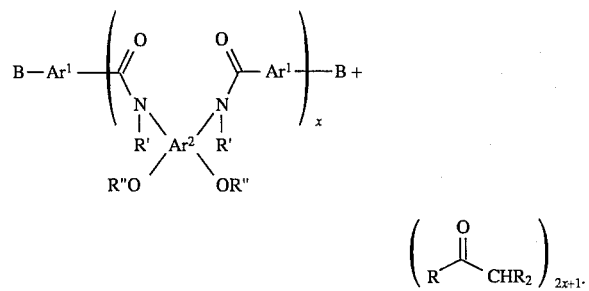

wherein each B is independently:

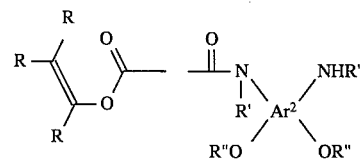

and x is as hereinbefore defined. In general, the polyamide, PBX, precursor product will comprise both end groups to at least some limited degree. Preferably, at least 1, more preferably 5, most preferably 10 percent, of the end groups in the polyamide, PBX, precursor product will be an alkenyl ester end group.

In general, the reaction temperature is maintained sufficiently low during the preparation of polyamide, PBX precursor such that cyclocondensation does not occur to any substantial extent during its preparation although some cyclization may be evident. The ketone, aldehyde, or other molecule formed upon the reaction of the aromatic bis(alkenyl)ester and aromatic diamine will generally be gaseous at the reaction temperatures and a purification step is not normally required to remove them from the finished oligomer or prepolymer. In general, the reaction is preferably carried out under an inert atmosphere such as in nitrogen purge.

In addition to the aromatic bis(alkenyl)ester and ring forming, aromatic diamine, the reaction mixture may optionally contain a derivative of an aromatic dicarboxylic acid in which one of the functional groups is an acid chloride or imidazolide and the other functional group is an alkenyl ester or carboxylic acid such as compound represented by the formula:

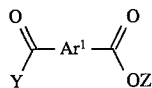  (III)

wherein $Ar^1$ is as hereinbefore defined, Y is a halide, preferably chloride, and Z is hydrogen or alkenyl. The reaction between an acid halide or imidazolide and amine functional group will proceed at a faster rate than the reaction between an alkenyl ester and amine functional group and the will proceed at a Easter rate than the reaction between an alkenyl ester and amine functional group and the amounts of each reactant (I), (II), and (III) and the time and temperature of the reaction should be adjusted accordingly. When employing a compound of Formula (III) and Z is hydrogen, the carboxyl group will normally be converted to an alkenyl ester group at some point in the preparation of the PBX polymer in order to obtain the desired composition for further polymerization and cyclization.

The reaction mixture may also optionally contain an acid chloride or imidazolide of an aromatic dicarboxylic acid such as:

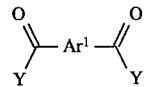  (IV)

wherein Y is either a halide, preferably chloride, or imidazolide. Since the reaction between an acid halide or imidazolide and amine generally proceeds rapidly in a manner which is hard to control by either time or temperature, a reaction mixture containing large amounts of the compound of Formula (IV) will often react to form an insoluble PBX polymer in the absence of carefully controlled reaction conditions, including very low reaction temperatures, or by properly selecting the concentrations of the various reactants employed. However, the larger the concentration of a bis-(alkenyl)ester and/or monoalkenyl ester of Formula (III), the more easily the reaction containing a diacid halide can be controlled.

A reaction mixture comprising an acid halide of either Formula (III) or (IV) is generally less preferred since the reaction of the acid halide with the amine liberates a hydrogen halide such as hydrogen chloride which is normally corrosive and may necessitate purification of the precursor product prior to further processing.

If employed, the amount of a compound of either Formula III or IV most advantageously employed is dependent on a variety of factors including the specific reactants and the organic liquid reaction medium. In general, if employed the additional reactants are employed in an amount of less than 90, preferably from about 1 to about 75, more preferably from 2 to about 60, mole percent based on the total moles of aromatic bis(alkenyl)ester and aromatic diamine employed.

A monofunctional aromatic alkenyl ester, e.g.:

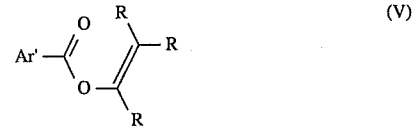  (V)

or an aromatic ortho monoamine such as

  (VI)

wherein $Ar^1$, $Ar^1$, R, M, R', and R" are as hereinbefore defined can also optionally be employed in the reaction mixture. If employed, the monofunctional aromatic alkenyl ester or aromatic ortho monoamine acts as a chain terminator which has an effect on the molecular weight of the PBX polymer. The use of a chain terminator can provide increased stability, e.g., thermal, thermo-oxidative, and hydrolytic stability, since the end groups are less reactive and susceptible to degradation. The increased stability, if any, is dependent on the various monomers employed and the molecular weight of the final PBX polymer.

The monofunctional aromatic alkenyl ester or other chain terminator (e.g., ortho-aminophenols) may be added to the reaction mixture prior to or during the reaction of the bis(alkenyl)ester and the aromatic diamine. Alternatively, the alkenyl ester end groups may be converted to inert groups following the reaction of the bis(alkenyl)ester and the aromatic diamine. In general, when employed, the monofunctional chain terminator is employed in an amount from about 0.01 to about 30, preferably from about 0.1 to about 10, more preferably in an amount from about 0.2 to about 5, mole percent based on the total moles of aromatic bis(alkenyl)ester and aromatic diamine employed.

Following preparation of the polyamide, PBX precursor, a PBX polymer is easily prepared, without purification, by heating the polyamide, PBX precursor at a temperature sufficient to effect partial or full chain extension and cyclocondensation (e.g., cyclodehydration). Depending on the specific conditions employed, the chain extension and cyclocondensation may occur simultaneously (both chain extension and cyclocondensation occurring at the same time, although the rates of chain extension and cyclocondensation may vary significantly) or sequentially (chain extension occurring in the essentially absence of cyclocondensation followed by cyclocondensation or cyclocondensation occurring in the essentially absence of chain extension followed by chain extension).

The time and temperature most advantageously employed will vary depending on the specific monomers employed, particularly their reactivity, the specific polymer, and the organic liquid. In general, the chain extension (advancement) and cyclodehydration reaction will be conducted at a temperature from about 175° C. to about 500° C. preferably from about 200° C. to about 400° C. These temperatures normally will cause evaporation of the solvent. The partial or full chain extension and cyclodehydration is believed to occur in a solid state. Reaction times will preferably vary from about 1 to about 20, more preferably from about 1 to about 5 hours. In general, it is most preferred to start at a lower temperature and raise the temperature periodically during the advancement/cyclocondensation reactions.

Although not being bound by the theory, representative chain extension and cyclocondensation reactions in the preparation of a PBX polymer are believed to be represented:

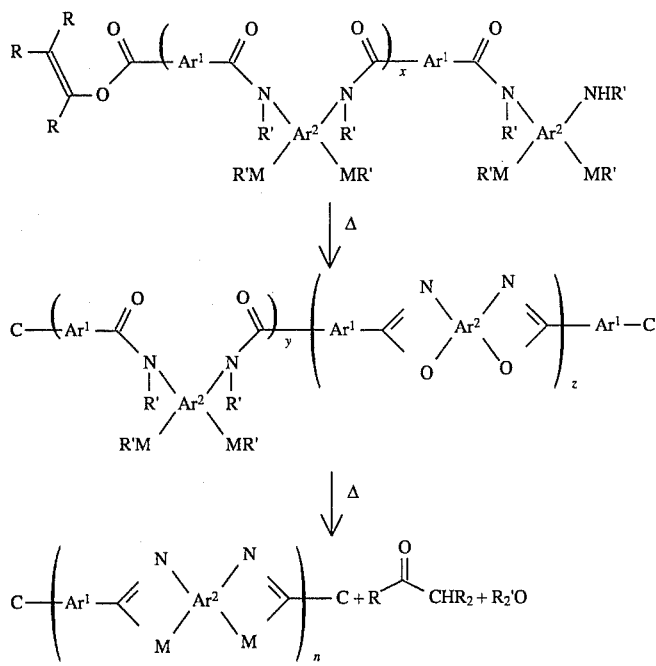

wherein each C is of independently:

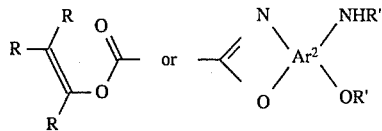

and Ar¹, Ar², R', M are as hereinbefore defined. For example, the poly(amide/benzazole) intermediate can be represented as follows:

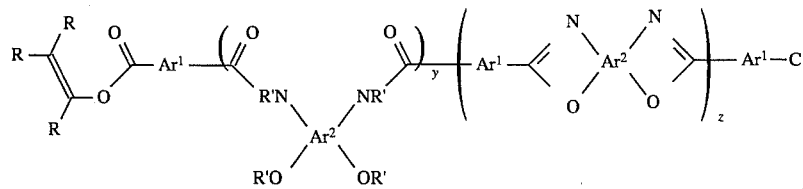

wherein C is as hereinbefore defined and y and z can be any number of 1 or more. The ratio of x/y can vary extensively but is generally from about 0.0001 to about 10,000 and more generally from about 0.01 to about 100.

The polyamide, PBX precursor can be directly cast as a film, prepared as a coating or poured into a non-solvent to precipitate the polyamide, PBX precursor. Water, methanol, acetone and other similar polar liquids are typical non-solvents which can be used to precipitate the precursor. If the precursor is obtained in solid form, it may be further processed using conventional compression molding techniques or melt spinning, casting or extrusion techniques provided the solid precursor has a sufficiently low glass transition temperature. Such techniques are well known in the art and reference is made to U.S. Pat. No. 3,449,296 and EP No. 317,942 which describes such methods and are herein incorporated by reference. If the reaction is conducted at sufficiently high temperatures, e.g., temperatures which exceed about 185° C. the polyamide, PBX precursor will advance and cyclocondense to form the final PBX polymer during the melt casting, coating or extrusion step.

More commonly, the polyamide, PBX precursor is processed directly from the organic liquid reaction solution and the advantages of the present invention are more fully realized in that instance. Since the precursor is soluble in the organic liquid reaction medium, whereas the final polymer is insoluble, the organic solution of the precursor can be cast or applied and the solvent evaporated. Upon evaporation of the solvent, a solid material results. Molecular weight increase (chain extension or advancement) and cyclocondensation to form benzoxazole rings occur upon exposure to a sufficiently high temperature.

For example, coatings of a PBX polymer such as an insulative coating on an electronic wafer are easily prepared by casting a film of, or otherwise coating a substrate with, the organic liquid solution of the PBX precursor and then evaporating the solvent and exposing the PBX precursor to temperatures sufficient to advance and cyclocondense the polyamide, PBX precursor. Specifically, upon cyclocondensation, the final PBX polymer forms a complete or substantially complete coating over the substrate article.

In addition, the precursor of the present invention can also be employed to make shaped articles, films, fibers, foams, and the like. In general, techniques well known in the art for casting polymers or prepolymers from solution can be employed in the preparation of such products. See, for example U.S. Pat. No. 3,449,296 and *Polymer Processing Technologies,* edited by Fred W. Billmeyer, "Textbook of Polymer Science" Part 6, 3rd ed., 1984, New York, Wiley Interscience, Inc. which are both incorporated by reference herein.

Films can be prepared by casting the solution of the polyamide, PBX precursor and thereafter evaporating the solvent and heating to form a solid film material.

In preparing shaped PBX articles, additives such as fillers, pigments, carbon black, conductive metal particles, abrasives and lubricating polymers are often advantageously employed. The method of incorporating the additives is not critical and they can conveniently be added to the precursor solution prior to preparing the shaped article. The liquid compositions containing the oligomer or PBX precursor, alone or also containing fillers, may be applied by any of the usual techniques (doctoring, rolling, dipping, brushing, or spraying) to a number of different substrates. If the PBX polymer is prepared in solid form, the additives can be added to the melt prior to processing into a shaped article.

In using the polyamide, PBX precursor for structural composite or adhesive applications and for protective and release coating applications, the precursor solution may be applied onto fibrous reinforcing materials such as glass fibers, quartz, carbon or organic fibers and then the precursor "advanced" to a high molecular weight and cyclocondensed to form benzoxazole rings to prepare composite parts. In addition, the solution may also be applied onto substrate surfaces such as copper, wires and silicon wafers for protective insulated purposes.

In one method for preparing foams, a gaseous blowing agent such as air, nitrogen or carbon dioxide is dispersed as small gaseous droplets into the solution of the PBX polymer precursor prior to advancement and cyclocondensation. Alternatively, the precursor can be advanced and cyclocondensed and a blowing agent, either alone or with one or more other additives, may be added to a melt which is subsequently formed.

The following examples are set forth to illustrate the present invention and should not be construed to limit its scope. In the examples, all parts and percentages are by weight unless otherwise indicated.

EXAMPLE 1

To a 15 milliliter (mL) single-necked round bottom flask equipped with a magnetic stirrer, reflux condenser and gas adaptor is charged a solution of 2 grams (g) of diisopropenyl isophthalate, 1.76 g of 3,3'-dihydroxybenzidine as a solution in 20 mL of N-methylpyrrolidinone. While being agitated, the solution is sparged with nitrogen for a period of about 15 minutes and then heated to a temperature of 200° C. for an 8 hour period. At the end of the 8 hours, the solution is filtered through a glass frit to remove a small amount (0.05 g) of insoluble material and a filtrate solution of poly(ortho-hydroxyamide) bottled. The filtrate solution is cooled to room temperature.

A portion of the cooled poly(ortho-hydroxyamide) reaction solution is poured onto an 8 inch by 8 inch glass plate. The coated glass plate is heated in a vacuum of less than 1 millimeter (nun) mercury at a temperature of 150° C. for 3 hours, 200° C. for 4 additional hours, 280° C. for 4 additional hours and 300° C. for 10 additional hours. This heating schedule permits a slow evaporation of the solvent followed by the advancement of molecular weight and cyclodehydration to form a high molecular weight polybenzoxazole polymer coating having a thickness of 12.5 micron.

The resulting coated glass plate is submerged in water at ambient temperature, e.g., from about 20° C. to about 25° C. for about 1 hour. The film is then peeled from the glass plate. It is a golden brown transparent film which is creasable. The film is then dried and subjected to Fourier Transform Infrared Analysis (FTIR) which showed absorptions corresponding to NH, OH and CO— as well as benzoxazole ring deformations consistent with a poly(ortho-hydroxyamides/benzoxazole) polymer. In addition, Thermal Gravimetric Analysis (TGA) (dynamic, $N_2$ purge, 10° C/min.) shows a weight loss of about 5.9 percent between 350° C. and 500° C. which is consistent with the loss of volatiles during chain advancement of molecular weight and cyclodehydrated benzoxazole formation.

A portion of the film of the poly(ortho-hydroxyamide/benzoxazole) copolymer is heated under a nitrogen atmosphere from ambient temperatures to about 375° C. and maintained at this temperature for about 1 hour. It is then cooled to ambient temperature while maintaining a nitrogen atmosphere. The thus heated film is dried in a vacuum at a temperature of about 100° C. for about 2 hours and then stored in a desiccator. FTIR analysis of this film shows that the absorptions corresponding to NH, OH and CO— are virtually gone. Thus, this film consists almost exclusively of cyclodehydrated PBO. TGA analysis shows a 1 percent weight loss at 411° C., a 5 percent loss in weight at 506° C. and a 10 percent weight loss at 550° C. Differential scanning calorimetry (DSC) shows that PBO polymer exhibited no glass transition.

EXAMPLE 2

In a manner similar to that of Example 1, a solution of 2 g of diisopropenyl isophthalate and 1.76 g of 3,3'-dihydroxybenzidine in 40 mL of N-methylpyrrolidinone is heated at 170° C. for 30 hours with agitation. The reaction mixture is again filtered and the filtrate solution bottled.

A 5 mL aliquot of the polymer(ortho-hydroxyamide) reaction solution is cast onto 3 different circular 2 inch diameter silicon wafers. Each of the wafers is heated in a vacuum for 3 hours at 200° C., 3 hours at 225° C. and 4 hours at 300° C. They are then heated under a nitrogen atmosphere for an additional 1 hour at 200° C., 1 hour at 250° C., 2 hours at 300° C., and 4 hours at 400° C. At the end of this heat treatment, tough, scratched resistant film coatings, exhibiting excellent adhesion to the surface of the wafer are formed.

FTIR analysis of the resulting polymer indicates an essential absence of NH, OH, CO— and that the polymer is a fully cyclodehydrated PBO.

The coated wafers are subjected to five cycles between ambient temperature and 400° C., each cycle consisting of heating the wafer at a rate of 1° C. per minute and cooling at 5° C. per minute. During this temperature cycling, the curvature of the wafers are monitored and the coefficient of thermal expansion for the coatings calculated to be about 8 ppm. The appearance, integrity, toughness and adhesion characteristics of the coating are not affected during thermal cycling.

A different aliquot of the poly(ortho-hydroxyamide) reaction solution is poured onto an 8 inch by 8 inch glass plate. The coated glass plates are heated for 18 hours at a temperature of 40° C. under a vacuum of less than 1 mm mercury which evaporates the solvent to a dried thickness of 12.5 micron. The film residue is then heated under vacuum for 3 hours at 200° C., an additional 3 hours at 225° C., an additional 3 hours at 250° C. and an additional 5 hours at 300° C. Following that temperature exposure, the glass plate is heated under a nitrogen atmosphere for 1 hour 200° C., 1 additional hour at 250° C., 2 additional hours at 300° C. and 2 hours at 400° C. The resulting film is golden brown and transparent and is removed from the glass plate by soaking in warm water. When removed, the film is transparent and creasable. The coefficient of thermal expansion for this film is measured by Thermal Mechanical Analysis (TMA) to be 10.6 ppm.

The solvent resistance of the thus formed PBO film is measured by soaking individual film pieces about 1 inch by 2 inch by 0.5 mil thickness in a variety of organic solvents at ambient temperature for one week. At the end of the one week period, the films are removed from the organic liquids, the surfaces dried and weight gain measured. The PBO film exhibits no weight gain from being exposed to toluene, a 1.5 percent weight gain from being exposed to N-methylpyrrolidinone, 2.1 percent weight gain from being exposed to acetone, 7.9 percent weight gain from being exposed to tetrahydrofuran, 9.4 percent weight gain from being exposed to methanol, 14.9 percent weight gain from being exposed to N,N'-dimethylformamide and 17 percent weight gain from being exposed to dichloromethane. Water absorption is measured by immersing a piece of film in refluxing deionized water for one week. The weight gain of deionized water after one week is 2.6 percent.

The tensile properties of the PBO film are also measured using a Instron Corp. Model 4507 with a Series IX Automated Materials Testing System 1.01 using 10 centimeters (cm) long strips with a gauge length of 5 cm by 0.64 cm by 12.5 micron thickness and a crosshead speed of 0.5 cm per minute (50% relative humidity, ambient temperatures). The tensile strength at break is found to be 120.7 megaPascal (MPa), the elongation at break 2.5 percent and the modulus 5.31 gigaPascal (GPa).

EXAMPLE 3

Into a 100 mL 3-necked kettle equipped with mechanical stirrer, reflux condenser, and 2 gas adaptors is added a solution of 60 mL N-methylpyrrolidinone, 5 g of diisopropenyl isophthalate, and 4.4 g of 3,3'-dihydroxybenzidine. The resulting solution is sparged with nitrogen for about 15 minutes with the condenser cooling water turned off and the nitrogen flow at about 10 mL per minute. The solution is then heated to 160° C. After 10 hours at this temperature, the condenser cooling water is turned on and the reaction mixture maintained at 160° C. for an additional 20 hours. The reaction mixture is then cooled to ambient temperature.

A 10 mL portion of the reaction mixture is filtered through a 4.5 to 5 micrometer glass frit. A portion of the filtered reaction mixture was cast onto an 8 inch by 8 inch glass plate. The glass plate was then heated to 50° C. to 75° C. in a vacuum of less than 1 mm mercury for 5 hours to evaporate the solvent. The glass plate in the resulting film residue is then heated to 150° C. for 15 hours to ensure complete solvent removal. The glass plate with the thus formed film (12.5 micron thickness) is cooled to ambient temperature and submerged in water. The film is then peeled from the glass plate. The film is a bright yellow, transparent poly(ortho-hydroxyamide) film which is creasable. FTIR analysis shows strong absorptions corresponding to the NH, OH, and CO- indicating that little or no cyclodehydration occurred during the heating of the reaction mixture. In addition, DSC analysis indicated a glass transition temperature of about 250° C. (first scan 10° C./min., nitrogen purge). The tensile properties of the thus formed poly(ortho-hydroxyamide), were found to be 91.7 MPa with a percent elongation of break of 9.1 percent and a modulus of 4.55 GPa.

A portion of film separated from the glass plate is heated in a vacuum for 2 hours at 200° C., 4 hours at 250° C., and 5 hours at 300° C. followed by additional heating, under nitrogen atmosphere, of 2 hours at 300° C. to 350° C., 2 hours for 350, 2 additional hours at 375° C. and 2 more hours at 400° C. After this heat treatment, a uniform transparent, tan colored PBO film results.

An additional 20 mL portion of the reaction mixture is filtered through a glass frit and cast onto two 8 inch by 8 inch glass plates. These coated plates are heated in a vacuum for 50° C. to 70° C. for 5 hours to remove the reaction solvent. Each of the coated glass plates are then heated under vacuum for 3 hours at 200° C., 3 additional hours at 225° C., 3 more hours at 250° C. and finally 5 additional hours at 300° C., followed by an additional heat treatment under a nitrogen atmosphere consisting of 1 hour at 200° C., 1 hour at 250° C., followed by 2 hours at 300° C. and then 2 hours at 400° C. In both cases, the resulting film is transparent tan colored. The glass plates with the films are cooled to ambient temperature then immersed in hot water for 1 to 2 hours with the films thereafter being removed from the plates. These films are creasable without damage. When subjected to FTIR analysis, this film shows no absorptions corresponding to NH, OH, CO—. TGA analysis shows a 5 percent weight loss at 589° C. and a weight loss of 10 percent at 624° C. The film exhibits no glass transition.

Using the same techniques as employed in Example 2, the tensile strength of the film is found to be 134.6 MPa, with a percent elongation of break of 4.13 and a modulus of 4.27 GPa. A portion of the film is heated for 10 hours in air at a temperature of 300° C. After this treatment, the film exhibits a tensile strength of 156.5 MPa, an elongation at break of 5.55 percent, and a modulus of 4.41GPa.

When annealed at 325° C. for 10 hours in an air circulation oven, the PBO film exhibits a tensile strength of 144.8 MPa and an elongation at break of about 5.3 percent. After 10 hours at 350° C. in an air circulation oven, the PBO film exhibits a tensile strength of 143.8 MPa and an elongation at break of about 4.34 percent.

The hydrolyric stability of the PBO film was evaluated by soaking film samples which are about 4 inches by 2 inches by 0.5 mil thick in a 1 normal aqueous solution of NaOH for 24 hours and 96 hours and thereafter measuring their tensile strength and elongation. After exposure to the 1 normal NaOH solution, the tensile strength of the PBO film is found to be 148.2 MPa with an elongation of 4.93 percent, which compares favorably to the original tensile strength of 134.4 MPa and elongation at break of 4.1 percent. After 96 hours in the NaOH solution, the PBO film exhibits a tensile strength of 147.5 MPa and an elongation at break of 5.5 percent.

EXAMPLE 4

In a manner similar to Example 3, a poly(ortho-hydroxyamide) solution is prepared by reacting 10 g of diisopropenyl diisophthalate and 4.06 g of 3,3'-dihydroxybenzidine as a solution in the 120 mL of N-methylpyrrolidone except that after 10 hours at 160° C. without the condenser on, the reaction is heated for an addition 40 hours with the condenser on. During the 40 hour period, 1 mL aliquots of the reaction solution are obtained at various times during the reaction. The polymer in each aliquot is precipitated by adding the aliquot to water. The precipitated polymer is dissolved in sulfuric acid at a concentration of 0.5 g/deciliter (dl). The inherent viscosity of this solution (30° C.) is essentially zero prior to turning on the condenser. After about 22 hours, the inherent viscosity rises to about 0.16 dl/g. After about 27 hours, the inherent viscosity is about 0.25, and after about 31 hours the inherent viscosity is 0.39 dl/g rising to about 0.48 dl/g after about 35 hours. At the end of the 40 hour period, the inherent viscosity is 0.6 dl/g. The increasing inherent viscosity over time of reaction indicates that the molecular weight of the poly(ortho-hydroxy)amide prepolymer can be controlled by reaction time.

EXAMPLE 5

To a 50 ml four necked round bottom kettle equipped with a mechanical stirrer and a gas inlet with a stopcock, stopper and vacuum adapter is charged 6.22 g of 3,3'-diaminobenzidine ($2.90 \times 10^{-2}$ mole), 7.15 g of diisopropenyl isophthalate ($2.09 \times 10^{-2}$ mole) and 50 ml of anhydrous N-methylpyrrolidinone. The reactor kettle is sealed and then evacuated to about 0.5 mmHg using a mechanical pump. The reactor is then purged with anhydrous nitrogen gas (ambient pressure). The resulting solution is stirred under a slow $N_2$ purge and heated to 170° C. for 40 h. The reaction mixture is then cooled to ambient temperature and poured into water which precipitates the polymeric product. The yellow percipitate in the form of a powder is collected on a Buchner funnel, rinsed with methanol, then dried in a vacuum of about 1.0 mmHg at 100° C. for 15 hours.

The dried powder is analyzed using DSC, FTIR, and NMR which all indicate the reaction product comprises poly(ortho-amino)amide. A 2 g sample of the powder is dissolved in NMP (20% solids). The solution is cast onto a glass plate and placed into a vacuum oven maintained at 50° C., and about 1.0 mmHg to remove the solvent. The polymer film residue is quite brittle indicating moderate to low molecular weight for the isolated product.

A 10.15 mg sample of the powder is isolated as described above and heated twice in a DSC apparatus under a blanket of $N_2$ at a rate of 10° C./min. to an ultimate temperature of 400° C. Following the second heating stage, the sample was cooled, then analyzed by DSC and FTIR. The DSC trace shows a glass transition (Tg) at 345° C. and the FTIR spectrum shows absorbtions at 3700–2800 cm$^{-1}$ (NH) and at 2900 cm$^{-1}$.

What is claimed is:

1. A method for preparing a polyamide precursor of a polybenzazole polymer, which method comprises reacting together:

(a) an aromatic bis(alkenyl)ester;

(b) an aromatic diamine having ring closing functional groups MR" ortho to each amine group, wherein MR" is halogen, or M is oxygen, sulfur NH, or NR", and R" is hydrogen, alkyl or inertly substituted alkyl, aryl or inertly substituted aryl, acyl, or aroyl, alkoxycarbonyl, aryloxycarbonyl, or trialkylsilyl; and (c) a derivative of an aromatic dicarboxylic acid represented by the formula:

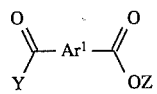

wherein Z is hydrogen or alkenyl and Y is either chloride or imidazolide and Ar$^1$ is aromatic or inertly or essentially inertly substituted aromatic.

2. The method of claim 1 wherein the aromatic dicarboxylic acid derivative is employed in an amount from about 1 to about 75 mole percent based on the total moles of aromatic bis(alkenyl)ester and aromatic diamine.

3. The method of claim 1 wherein M is oxygen, NH, or sulfur, and R" is hydrogen, an alkyl group having 1 to 4 carbon atoms, or a trialkylsilyl group.

4. A method for preparing a polyamide precursor of a polybenzazole polymer, which method comprises reacting together:

(a) an aromatic bis(alkenyl)ester:

(b) an aromatic diamine having ring closing functional groups MR" ortho to each amine group, wherein MR" is halogen, or M is oxygen, sulfur, NH, or NR", and R" is hydrogen, alkyl or inertly or essentially inertly substituted alkyl, aryl or inertly substituted aryl, acyl or aroyl, alkoxycarbonyl, aryloxycarbonyl or trialkysilyl; and (c) an acid chloride or imidazolide of an aromatic dicarboxylic acid of the formula:

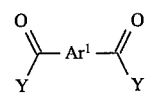

wherein Y is either a halide or imidazolide and Ar$^1$ is an aromatic or inertly or essentially inertly substituted aromatic.

5. The method of claim 4 wherein the acid chloride or imidazolide of the aromatic dicarboxylic acid is employed in an amount from about 1 to about 75 mole percent based on the total moles of aromatic bis(alkenyl)ester and aromatic diamine.

6. The method of claim 4 wherein M is oxygen, NH, or sulfur; and R" is hydrogen, an alkyl group having 1 to 4 carbon atoms, or a trialkylsilyl group.

7. A method for preparing a polyamide precursor of a polybenzazole polymer, which method comprises reacting together:

(a) an aromatic bis(alkenyl)ester;

(b) an aromatic diamine having ring closing functional groups MR" ortho to each amine group, wherein MR" is halogen, or M is oxygen, sulfur, NH or NR", and R" is hydrogen, alkyl or inertly substituted alkyl, aryl or inertly or essentially inertly substituted aryl, acyl or aroyl, alkoxycarbonyl, aryloxycarbonyl or trialkylsilyl; and (c) a monofunctional aromatic alkenyl ester of the formula:

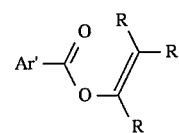

or an aromatic ortho monoamine of the formula:

wherein Ar$^1$ and Ar' are independently an aromatic or inertly substituted aromatic.

8. The method of claim 7 wherein the monofunctional aromatic alkenyl ester or aromatic ortho monoamine is employed in an amount of from about 0.1 to about 10 mole percent based on the total moles of aromatic bis(alkenyl)ester and aromatic diamine.

9. The method of claim 7 wherein M is oxygen, NH, or sulfur; and R" is hydrogen, an alkyl group having 1 to 4 carbon atoms, or a trialkylsilyl group.

* * * * *

UNITED STATES PATENT AND TRADEMARK OFFICE
CERTIFICATE OF CORRECTION

PATENT NO. : 5,534,614
DATED : July 9, 1996
INVENTOR(S) : James J. O'Brien & Edmund P. Woo It is certified that error appears in the above-indentified patent and that said Letters Patent is hereby corrected as shown below:

Title page, items [19] & [75], "O'Briem et al." should -- James J. O'Brien --.

Col.24, line 5,
In line 8 of Claim 4, please delete "or essentially inertly"

Col. 24, line 7,
In line 10 of Claim 4, "trialkysilyl" should read --trialkylsilyl--.

Col. 24, line 35,
In line 7 of Claim 7, "NH" should read --NH,--.

Col. 24, line 55,
In line 17 of Claim 7, "or inertly" should read --or essentially inertly--.

Signed and Sealed this

Eighth Day of July, 1997

Attest:

BRUCE LEHMAN

Attesting Officer

Commissioner of Patents and Trademarks